(12) United States Patent
Tamigniaux et al.

(10) Patent No.: US 11,973,393 B2
(45) Date of Patent: Apr. 30, 2024

(54) MOVABLE PART OF A LINEAR MOTOR COMPRISING A CARRIAGE INTERFACE MEMBER

(71) Applicant: ETEL S.A., Môtiers (CH)

(72) Inventors: Philippe Tamigniaux, Morteau (FR); Yannick Droval, Neuchatel (CH)

(73) Assignee: ETEL S.A., Môtiers (CH)

( * ) Notice: Subject to any disclaimer, the term of this patent is extended or adjusted under 35 U.S.C. 154(b) by 121 days.

(21) Appl. No.: 17/873,342

(22) Filed: Jul. 26, 2022

(65) Prior Publication Data

US 2023/0031626 A1 Feb. 2, 2023

(30) Foreign Application Priority Data

Jul. 28, 2021 (EP) ..................................... 21188165

(51) Int. Cl.
H02K 41/02 (2006.01)

(52) U.S. Cl.
CPC .................................... H02K 41/02 (2013.01)

(58) Field of Classification Search
CPC ...... H02K 41/02; H02K 41/025; H02K 41/03; H02K 41/031; H02K 41/033; H02K 41/035; H02K 41/0352; H02K 41/0354; H02K 41/0356
USPC ...................... 310/12.27, 12.31, 12.32, 12.11
See application file for complete search history.

(56) References Cited

U.S. PATENT DOCUMENTS

| 5,701,042 | A | * | 12/1997 | Takei | ................... | H02K 41/031 |
| | | | | | | 318/135 |
| 6,191,507 | B1 | * | 2/2001 | Peltier | ................... | B65G 54/02 |
| | | | | | | 318/135 |
| 8,030,804 | B2 | | 10/2011 | Aso et al. | | |
| 11,025,152 | B2 | | 6/2021 | Mottier et al. | | |
| 2013/0313920 | A1 | * | 11/2013 | Ida | ....................... | H02K 41/031 |
| | | | | | | 310/28 |
| 2018/0138785 | A1 | * | 5/2018 | Fernandes Goncalves | ................. |
| | | | | | | H02K 9/22 |

(Continued)

FOREIGN PATENT DOCUMENTS

| EP | 2975746 A1 | 1/2016 |
| JP | S61147768 A | 7/1986 |
| WO | 98/50760 A2 | 11/1998 |

OTHER PUBLICATIONS

European Search Report issued in corresponding EP Application No. 21188165.1 dated Jan. 25, 2022, pp. 1-2.

*Primary Examiner* — Michael Andrews

(74) *Attorney, Agent, or Firm* — Carter, DeLuca & Farrell LLP

(57) ABSTRACT

A movable part of a linear motor, having a primary part movable relative to a secondary part, includes a carriage, the primary part, and an interface member for removably connecting the carriage to the primary part. The carriage is configured to fixedly support an object to be moved, such as, for example, a machine part of a machine tool. The carriage includes two opposite lateral sides and a bottom side having an interface member receiving portion including anchoring receiving parts. The carriage interface member is fixedly connected to the primary part and includes anchoring portions mounted on respective anchoring receiving parts of the carriage. Two opposite edge portions of the carriage interface member are aligned and are fixedly connected to a portion of respective opposite lateral sides of the carriage.

17 Claims, 4 Drawing Sheets

(56) References Cited

U.S. PATENT DOCUMENTS

2020/0204055 A1* 6/2020 Mottier .................. B65G 23/23

* cited by examiner

MOVABLE PART OF A LINEAR MOTOR COMPRISING A CARRIAGE INTERFACE MEMBER

CROSS-REFERENCE TO RELATED APPLICATIONS

The present application claims priority to Application No. 21188165.1, filed in the European Patent Office on Jul. 28, 2021, which is expressly incorporated herein in its entirety by reference thereto.

FIELD OF THE INVENTION

The present invention relates to a movable part of a linear motor, which includes, for example, a carriage, a primary part of the linear motor, and a carriage interface member for removably connecting the carriage to the primary part. The present invention also relates to a linear motor including such movable part.

BACKGROUND INFORMATION

Linear motors may be used for rapid positioning of objects, such as a machine part of a machine tool. Linear motors include a primary part or movable part and a secondary part or stationary part. A carriage adapted to carry the machine part is connected to the primary part. The secondary part typically includes a magnetic track having permanent magnets fixed between linear guides to provide a magnetic reciprocated action between the primary and secondary parts to move the carriage along the linear guides. A conventional linear motor is described, for example, in U.S. Pat. No. 8,030,804.

In certain conventional linear motors, the primary part is connected to the bottom side of the carriage by screws passing through the carriage from its top side to its bottom side. In certain applications, the machine part to be moved is fixed to the top side of the carriage. It is therefore necessary to remove first the machine part from the top side to access the linear motor for replacement or maintenance purposes which often entail a complex and tedious disassembling procedure.

U.S. Pat. No. 11,025,152 describes an interface apparatus for a linear motor to overcome the above problem. The interface apparatus includes many parts, including, for example, wedges, which require tight mechanical tolerances, which are costly to manufacture. Moreover, the wedges induce significant internal stresses in the carriage, which should be avoided for front-end high-performance applications.

SUMMARY

Example embodiments of the present invention provide a movable part of a linear motor, which includes a carriage, a primary part of the linear motor, and a carriage interface member for removably connecting the carriage to the primary part, the carriage interface member being adapted to reduce mechanical deformations thereby increasing the positioning repeatability of an object to be moved.

Example embodiments of the present invention provide a carriage interface member, which is cost-effective to manufacture.

Example embodiments of the present invention provide a lightweight carriage interface member.

According to an example embodiment of the present invention, a movable part of a linear motor includes a primary part movable relative to a secondary part. The movable part includes a carriage, the primary part, and a carriage interface member for removably connecting the carriage to the primary part. The carriage is configured to fixedly support an object to be moved, such as a machine part of a machine tool. The carriage includes two opposite lateral sides and a bottom side having an interface member receiving portion including anchoring receiving parts. The carriage interface member is fixedly connected to the primary part and includes anchoring portions connected to respective anchoring receiving parts of the carriage. Two opposite edge portions of the carriage interface member are aligned and fixedly connected to a portion of respective opposite lateral sides of the carriage.

According to example embodiments, one edge portion of the carriage interface member includes carriage fixation threaded holes aligned with through-holes provided on one lateral side portion of the carriage. The edge portion is fixed to the lateral side portion by screws.

According to example embodiments, the opposite edge portion of the carriage interface member includes a tapered surface. Screws are screwed into threaded holes provided on the opposite lateral side portion of the carriage such that a distal end of the screws abuts against the tapered surface to produce a force on the carriage interface member that is perpendicular to the axes of the threaded holes.

According to example embodiments, the carriage interface member includes a top side having raised anchoring portions and a flat bottom side. The anchoring portions include raised central portions, each having a flat surface and primary part fixation holes extending from the flat surface to the bottom side, and two raised edge portions located on two opposite edges of the carriage interface member.

According to example embodiments, each of the anchoring receiving parts of the interface member receiving portion of the carriage includes a bearing surface. Each of the anchoring portions of the carriage interface member includes a resting surface resting on respective bearing surface.

According to example embodiments, each of at least two anchoring portions includes a recess extending from one lateral side of the anchoring portion towards an opposite lateral side of the anchoring portion to form the resting surface.

According to example embodiments, the anchoring portions extend across the carriage interface member perpendicularly from one to another opposite longitudinal sides of the member.

According to example embodiments, one lateral side portion of the carriage is flanked by two portions to form a cut-out portion. A reinforcing piece is removably fixed inside the cut-out portion by fixation device(s) extending through the thickness of the reinforcing piece. A distal end of the fixation device is connected to the lateral side portion.

According to example embodiments, the carriage interface member is arranged in the form of a rectangular plate and includes a stiffener in the form of a ridge extending in the middle of the rectangular plate along a longitudinal direction between the anchoring portions.

According to an example embodiment of the present invention, a linear motor includes a movable part as described herein.

Further features and aspects of example embodiments of the present invention are described in more detail below with reference to the appended schematic Figures.

DETAILED DESCRIPTION

Figure 1:
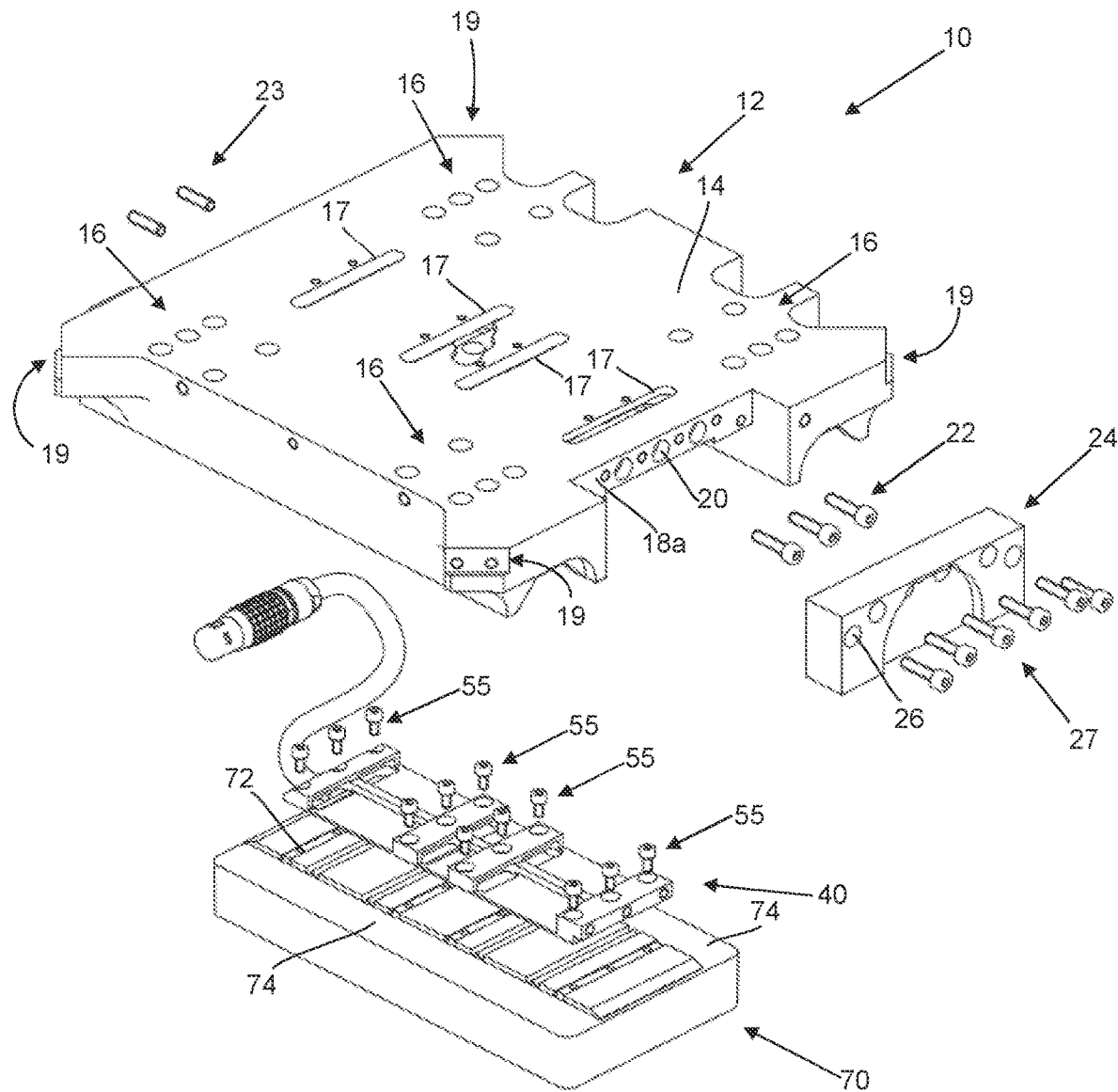
FIG. 1 is an exploded view of a movable part of a linear motor including a carriage, a carriage interface member, and a primary part according to an example embodiment of the present invention.

FIG. 1 illustrates a movable part 10 of a linear motor, including a carriage 12, a primary part 70, and a carriage interface member 40 for removably connecting the carriage 12 to the primary part 70 of the linear motor. The primary part 70 is adapted to cooperate with a secondary part of the linear motor, e.g., in a conventional manner. The secondary part typically includes a magnetic track having permanent magnets fixed between linear guides to provide a magnetic reciprocating action between the primary and secondary parts to move the carriage 12 along the linear guides.

Figure 2:
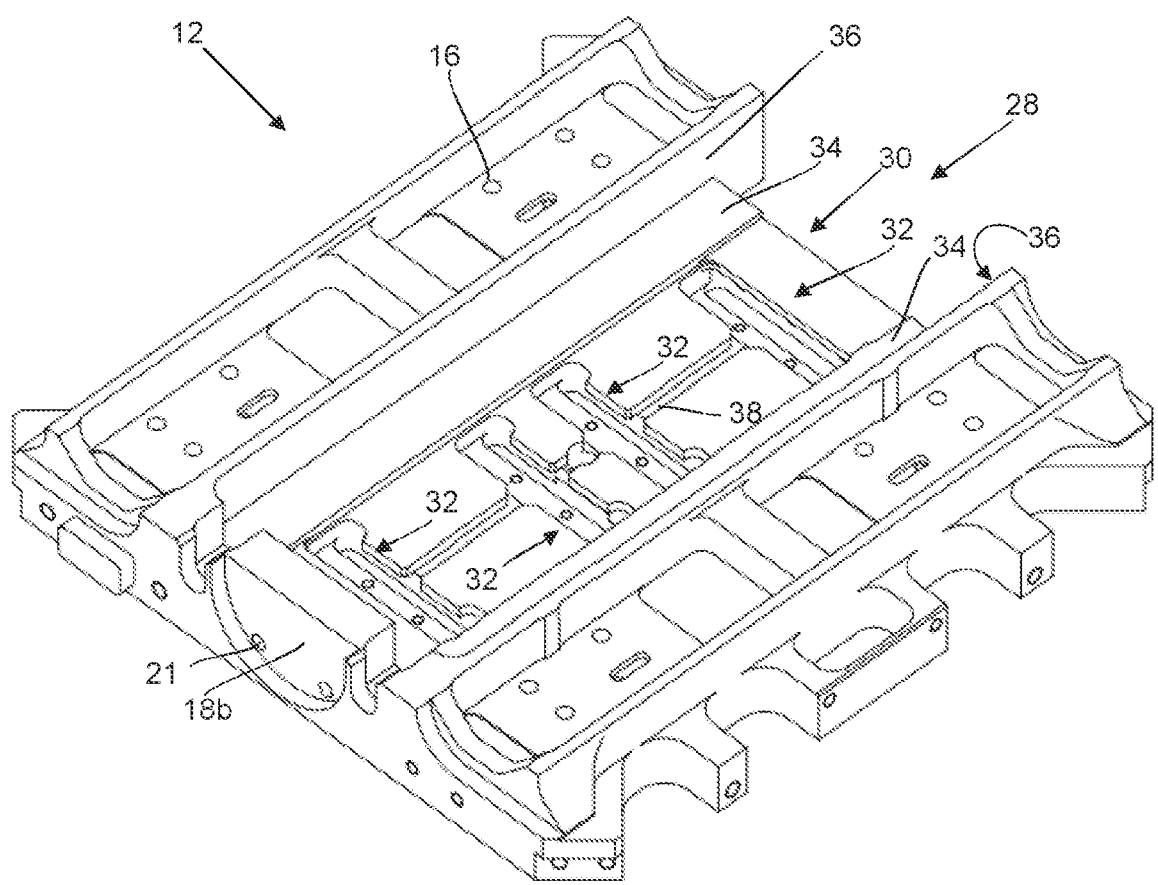
FIG. 2 is a perspective bottom view of the carriage.

The carriage 12 includes a top side 14 having a flat surface having connecting portions 16, which include a plurality of holes extending towards a bottom side 28 of the carriage 12, as illustrated in FIG. 2. These connecting portions 16 are used for fixing the carriage to moving blocks of the linear guides. Moreover, carriage 12 is configured for fixedly supporting an object to be moved, for example, a machine part of a machine tool. This is typically achieved by four lateral mounting surfaces 19 which have threaded holes and a shoulder to set precisely the vertical position of the object to be moved.

Figure 3:
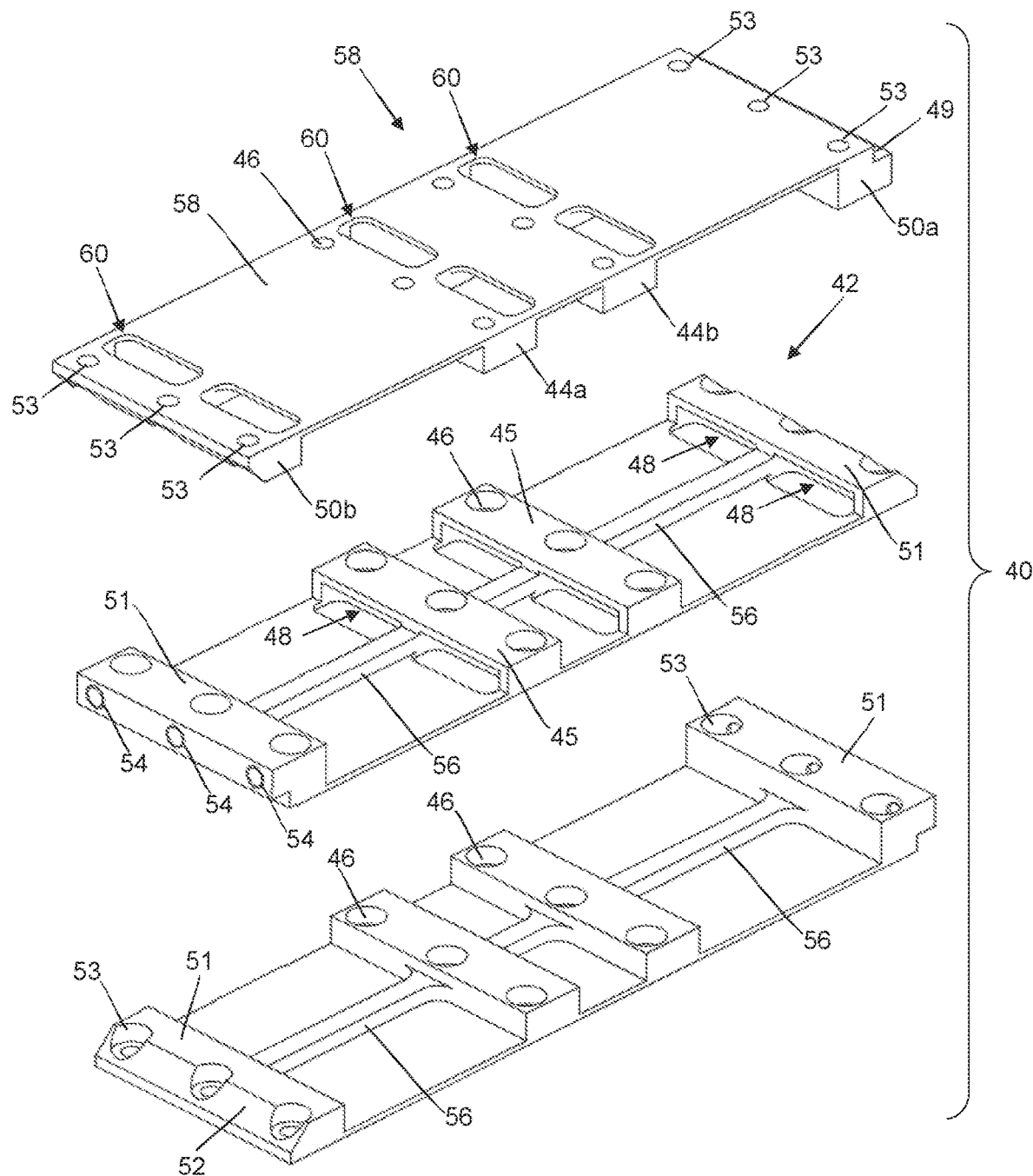
FIG. 3 are perspective views from various orientations of the carriage interface member.
Figure 4:
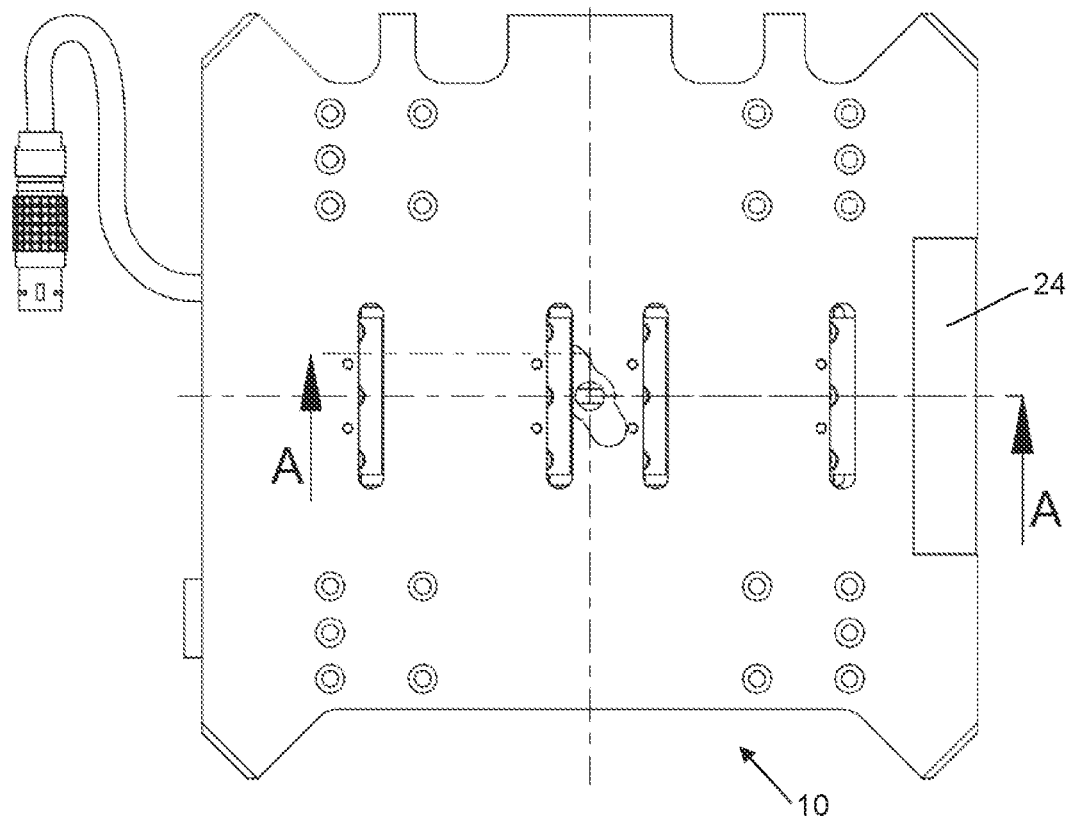
FIG. 4 is a top view of the movable part in an assembled state.

The carriage interface member 40 includes a top side 42 and a bottom side 58, as illustrated in FIG. 3, which are configured to be connected respectively to the carriage 12 and the primary part 70 of the linear motor. The carriage bottom side 28 illustrated in FIG. 2 includes a rectangular-shaped interface member receiving portion 30 having four anchoring receiving parts 32 shaped to cooperate with anchoring portions provided on the top side 42 of the carriage interface member 40, as described in more detail below. A linear groove 38 extends lengthwise between the anchoring receiving parts 32.

Two facing surfaces 34 extend along two opposite longitudinal sides of the interface member receiving portion 30 to face two lateral upper surfaces 74 of the primary part 70 of the linear motor, as illustrated in FIG. 1. The carriage bottom side 28 further includes two flanking portions 36 adapted to be positioned along two opposite upper side of the primary part 70.

Referring to FIG. 3, the top side 42 of the carriage interface member 40 includes two raised central portions 44a, 44b located near its middle and extending from one to the other of its two parallel opposite longitudinal edges. The top side 42 further includes two raised edge portions 50a, 50b bordering each of its two opposite lateral edges. Each raised central portion 44a, 44b includes an upper flat surface 45 provided with primary part fixation holes 46 extending from the flat surface 45 and opening onto the bottom side 58 of the carriage interface member 40. The bottom side 58 of the carriage interface member 40 is a flat surface to be fixed to the top part of the primary part 70.

Each raised edge portion 50a, 50b also includes an upper flat surface 51 provided with primary part fixation holes 53 extending from the flat surface 51 and opening onto the bottom side 58 of the carriage interface member 40. One raise edge portion 50a further includes a cantilevered portion provided with carriage fixation threaded holes 54 whose respective axis are parallel to the plane of the carriage top side 14 when the carriage interface member 40 is mounted into the interface member receiving portion 30. The other raised edge portion 50b includes an upper flat surface 51 and a tapered surface 52 extending from the upper flat surface to the corresponding lateral edge of the carriage interface member 40. The latter includes on its top side 42 a stiffener 56 in the form of a linear ridge or bulge. The stiffener 56 extends across the middle part of carriage interface member 40 from one to the other of its two opposite lateral sides between the anchoring portions 44a, 44b, 50a, 50b.

The two raised central portions 44a, 44b and one raised edge portion 50b each include two recesses 48 arranged on both sides of the stiffener 56 to create resting surfaces 49. The lower surface of the cantilevered portion of the raised edge portion 50a is arranged as a resting surface 49. Referring FIG. 5, each of the four anchoring receiving parts 32 of the rectangular-shaped interface member receiving portion 30 includes a protruding part extending in a direction parallel to the plane of the carriage top side to form a bearing surface 33. The resting surfaces 49 of the carriage interface member anchoring portions 44a, 44b, 50a, 50b are arranged to rest on respective bearing surfaces 33.

As illustrated in FIGS. 1 and 2, the carriage 12 includes two opposite lateral side portions 18a, 18b adjoining respective opposite lateral sides of the rectangular-shaped interface member receiving portion 30. Through-holes 20 are provided on lateral side portion 18a. The axes of these through-holes 20 are parallel to the plane of the carriage top side 14 when the carriage interface member 40 is mounted into the interface member receiving portion 30. Threaded holes 21 are provided on lateral side portion 18b. The axes of these holes are parallel to through-holes 20.

The carriage 12 is readily manufactured by machining. The slots 17 on the top side 14 of the carriage 12 are the result of machining the bearing surfaces 33 upon which the corresponding resting surfaces 49 rest. The linear groove 38 and the anchoring receiving parts 32 are also manufactured by machining the bottom side 28 of the carriage. Likewise, the elongated openings 60 on the bottom side 58 of the carriage interface member 40 are the result of machining the resting surface 49.

The assembly of the moveable part 10 is achieved as follows. The bottom side 58 of the carriage interface member 40 is fixed to the top part of the primary part 70 of the linear motor by multiple screws 55 extending through the primary part fixation holes 46, 53 of the carriage interface member 40 with their end portions screwed in respective fixation points 72 provided on the top side of the primary part 70.

Figure 5:
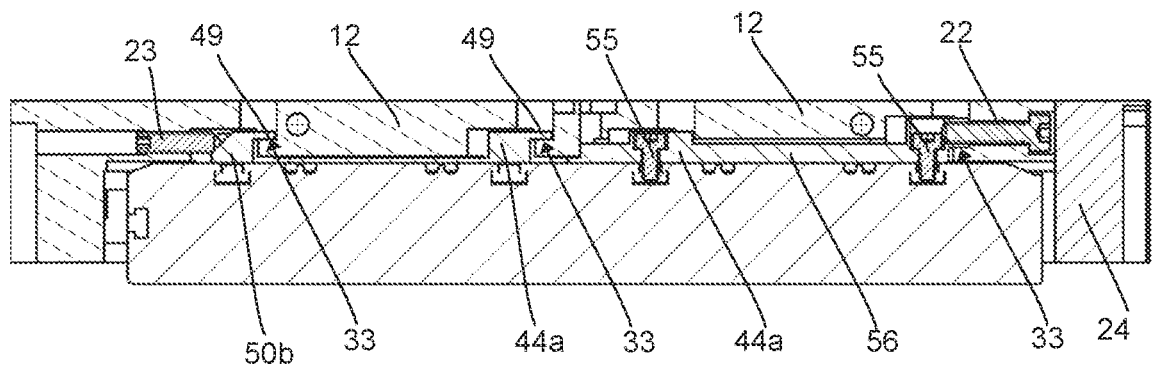
FIG. 5 is a cross-sectional view taken along the line A-A shown in FIG. 4.

The carriage interface member 40 is fitted inside the rectangular-shaped interface member receiving portion 30 with its anchoring portions 44a, 44b, 50a, 50b and its stiffener 56 positioned inside the corresponding anchoring receiving parts 32 and the linear groove 38, respectively. The interface member receiving portion 30 is translated relative to the carriage 12 along a direction parallel to the plane of the carriage top side to bring its resting surfaces 49 against the corresponding bearing surfaces 33 of the carriage 12 as illustrated in FIG. 5.

In this configuration, the carriage fixation threaded holes 54 of the cantilevered portion of the raised edge portion 50a are aligned with the through-holes 20 of the lateral side portion 18a of the carriage 12. This cantilevered portion is fixed to the adjoining lateral side portion 18a by screws 22. Headless screws 23 are adjusted inside the threaded holes 21 of the opposite lateral side portion 18b to abut against the tapered surface 52 of the raised edge portion 50a. In this manner, a perpendicular force is also created to make sure that resting surfaces 49 are tightly resting on bearing surfaces 33.

The carriage interface member 40 is made of a highly thermal conductive steel exceeding 40 W/mK, e.g., approximately 50 W/mK. The rectangular shape and dimensions of the carriage interface member may be chosen to cover the entire motor contact surface to increase heat transfer thereby improving the thermal behavior of the motor.

A reinforcing piece 24 may be removably mounted inside a cut-out portion of carriage 12 to increase its stiffness when customary applications generate high mechanical stresses on the carriage. One side of the reinforcing piece 24 is connected to the lateral side portion 18a by screws 24, as illustrated in FIG. 1. These screws 24 are mounted inside respective through-holes 26 extending across the thickness of the reinforcing piece.

Various modifications and variations to the example embodiments described above may be made without departing from the spirit and scope hereof. For example, the two opposite raised edge portions of the carriage interface member may be fixed to the lateral side portions of the carriage by other fixations devices, such as pins press-fitted into through-holes provided on the opposite lateral side portions of the carriage and corresponding holes provided on the two opposite raised edge portions of the carriage interface member.

LIST OF REFERENCE NUMERALS

10 Movable part
12 Carriage
14 Top side
16 Connecting portions
17 Slots
18a, 18b Lateral side portions
19 Lateral mounting surfaces
20 Through-holes
21 Threaded holes
22 Screws
23 Headless screws
24 Reinforcing piece
26 Through-holes
27 Screws
28 Bottom side
30 Interface member receiving portion
32 Anchoring receiving parts
33 Bearing surfaces
34 Facing surfaces
36 Flanking portions
38 Linear groove
40 Carriage interface member
42 Top side
44a, 44b Raised central portions
45 Upper flat surface
46 Primary part fixation holes
48 Recesses
49 Resting surface
50a, 50b Raised edge portions
51 Upper flat surface
52 Tapered surface
53 Primary part fixation holes
54 Carriage fixation threaded holes
55 Screws
56 Stiffener
58 Bottom side
60 Elongated opening
70 Primary part
72 Fixation points
74 Lateral upper surfaces

What is claimed is:

1. A movable part for a linear motor having a primary part movable relative to a secondary part, comprising:
   a carriage;
   the primary part; and
   a carriage interface member removably connecting the carriage to the primary part, the carriage being adapted to fixedly support an object to be moved;
   wherein the carriage includes two opposite lateral sides and a bottom side having an interface member receiving portion that includes anchoring receiving parts, the carriage interface member being fixedly connected to the primary part and including anchoring portions mounted on respective anchoring receiving parts of the carriage;
   wherein two opposite edge portions of the carriage interface member are aligned and fixedly connected to a portion of respective opposite lateral sides of the carriage;
   wherein a first one of the edge portions of the carriage interface member includes carriage fixation threaded holes aligned with through-holes provided on a first lateral side portion of the carriage and is affixed to the lateral side portion by screws; and
   wherein a second one of the edge portions of the carriage interface member opposite the first one of the edge portions includes a tapered surface, and screws screwed into threaded holes provided on a second lateral side portion of the carriage opposite the first lateral side portion produce a force on the carriage interface member perpendicular to an axis of the threaded holes by a distal end of the screws abutting against the tapered surface.

2. The movable part according to claim 1, wherein the carriage interface member includes a top side having raised anchoring portions and a flat bottom side, the anchoring portions including raised central portions, each raised central portion having a flat surface and primary part fixation holes extending from the flat surface to the bottom side, the carriage interface member including two raised edge portions located on two opposite edges of the carriage interface member.

3. The movable part according to claim 1, wherein each anchoring receiving part of the interface member receiving portion includes a bearing surface, and each anchoring portion of the carriage interface member including a resting surface resting on a respective one of the bearing surfaces.

4. The movable part according to claim 3, wherein each of at least two of the anchoring portions includes a recess extending from a lateral side of the anchoring portion toward an opposite lateral side of the anchoring portion to form the resting surface.

5. The movable part according to claim 1, wherein the anchoring portions extend across the carriage interface member perpendicularly between opposite longitudinal sides of the carriage interface member.

6. The movable part according to claim 1, wherein a lateral side portion of the carriage is flanked by two portions to form a cut-out portion, and a reinforcement piece is removably affixed inside the cut-out portion by a fastener extending through a thickness of the reinforcement piece, a distal end of the fastener being connected to the lateral side portion.

7. The movable part according to claim 1, wherein the carriage interface member is arranged as a rectangular plate and includes a stiffener arranged as a ridge extending centrally on rectangular plate along a longitudinal direction between the anchoring portions.

8. The movable part according to claim 1, wherein the object includes a machine part of a machine tool.

9. A movable part for a linear motor having a primary part movable relative to a secondary part, comprising:
- a carriage; and
- a carriage interface member adapted to removably connect the carriage to the primary part, the carriage being adapted to fixedly support an object to be moved;
- wherein the carriage includes two opposite lateral sides and a bottom side having an interface member receiving portion that includes anchoring receiving parts, the carriage interface member being fixedly connectable to the primary part and including anchoring portions mountable on respective anchoring receiving parts of the carriage; and
- wherein two opposite edge portions of the carriage interface member are alignable and fixedly connectable to a portion of respective opposite lateral sides of the carriage;
- wherein a first one of the edge portions of the carriage interface member includes carriage fixation threaded holes aligned with through-holes provided on a first lateral side portion of the carriage and is affixed to the lateral side portion by screws; and
- wherein a second one of the edge portions of the carriage interface member opposite the first one of the edge portions includes a tapered surface, and screws screwed into threaded holes provided on a second lateral side portion of the carriage opposite the first lateral side portion produce a force on the carriage interface member perpendicular to an axis of the threaded holes by a distal end of the screws abutting against the tapered surface.

10. A linear motor, comprising:
- a primary part movable relative to a secondary part;
- a carriage; and
- a carriage interface member removably connecting the carriage to the primary part, the carriage being adapted to fixedly support an object to be moved;
- wherein the carriage includes two opposite lateral sides and a bottom side having an interface member receiving portion that includes anchoring receiving parts, the carriage interface member being fixedly connected to the primary part and including anchoring portions mounted on respective anchoring receiving parts of the carriage;
- wherein two opposite edge portions of the carriage interface member are aligned and fixedly connected to a portion of respective opposite lateral sides of the carriage;
- wherein a first one of the edge portions of the carriage interface member includes carriage fixation threaded holes aligned with through-holes provided on a first lateral side portion of the carriage and is affixed to the lateral side portion by screws; and
- wherein a second one of the edge portions of the carriage interface member opposite the first one of the edge portions includes a tapered surface, and screws screwed into threaded holes provided on a second lateral side portion of the carriage opposite the first lateral side portion produce a force on the carriage interface member perpendicular to an axis of the threaded holes by a distal end of the screws abutting against the tapered surface.

11. The linear motor according to claim 10, wherein the carriage interface member includes a top side having raised anchoring portions and a flat bottom side, the anchoring portions including raised central portions, each raised central portion having a flat surface and primary part fixation holes extending from the flat surface to the bottom side, the carriage interface member including two raised edge portions located on two opposite edges of the carriage interface member.

12. The linear motor according to claim 10, wherein each anchoring receiving part of the interface member receiving portion includes a bearing surface, and each anchoring portion of the carriage interface member including a resting surface resting on a respective one of the bearing surfaces.

13. The linear motor according to claim 12, wherein each of at least two of the anchoring portions includes a recess extending from a lateral side of the anchoring portion toward an opposite lateral side of the anchoring portion to form the resting surface.

14. The linear motor according to claim 10, wherein the anchoring portions extend across the carriage interface member perpendicularly between opposite longitudinal sides of the carriage interface member.

15. The linear motor according to claim 10, wherein a lateral side portion of the carriage is flanked by two portions to form a cut-out portion, and a reinforcement piece is removably affixed inside the cut-out portion by a fastener extending through a thickness of the reinforcement piece, a distal end of the fastener being connected to the lateral side portion.

16. The linear motor according to claim 10, wherein the carriage interface member is arranged as a rectangular plate and includes a stiffener arranged as a ridge extending centrally on rectangular plate along a longitudinal direction between the anchoring portions.

17. The linear motor according to claim 10, wherein the object includes a machine part of a machine tool.

* * * * *